(12) United States Patent
Gardner

(10) Patent No.: US 7,502,828 B2
(45) Date of Patent: Mar. 10, 2009

(54) MESSAGING AND DOCUMENT MANAGEMENT SYSTEM AND METHOD

(75) Inventor: Jon S. Gardner, Stamford, CT (US)

(73) Assignee: ePostal Services, Inc., Stamford, CT (US)

( * ) Notice: Subject to any disclaimer, the term of this patent is extended or adjusted under 35 U.S.C. 154(b) by 890 days.

(21) Appl. No.: 10/803,601

(22) Filed: Mar. 17, 2004

(65) Prior Publication Data

US 2004/0202294 A1  Oct. 14, 2004

Related U.S. Application Data

(60) Provisional application No. 60/455,132, filed on Mar. 17, 2003.

(51) Int. Cl.
*G06F 15/16* (2006.01)

(52) U.S. Cl. .................................................. 709/206

(58) Field of Classification Search ............... 709/206; 715/500; 705/401
See application file for complete search history.

(56) References Cited

U.S. PATENT DOCUMENTS

| | | |
|---|---|---|
| 5,699,528 A | 12/1997 | Hogan |
| 5,826,241 A | 10/1998 | Stein et al. |
| 5,884,033 A | 3/1999 | Duvall et al. |
| 5,944,787 A | 8/1999 | Zoken |
| 5,970,469 A | 10/1999 | Scroggie et al. |
| 5,987,606 A | 11/1999 | Cirasole et al. |
| 6,014,634 A | 1/2000 | Scroggie et al. |
| 6,073,119 A | 6/2000 | Bornemisza-Wahr et al. |
| 6,101,485 A | 8/2000 | Fortenberry et al. |
| 6,122,657 A | 9/2000 | Hoffman, Jr. et al. |
| 6,128,298 A | 10/2000 | Wootton et al. |
| 6,134,660 A | 10/2000 | Boneh et al. |
| 6,141,695 A | 10/2000 | Sekiguchi et al. |
| 6,163,772 A | 12/2000 | Kramer et al. |
| 6,185,541 B1 | 2/2001 | Scroggie et al. |
| 6,212,265 B1 | 4/2001 | Duphorne |
| 6,223,168 B1 | 4/2001 | McGurl et al. |
| 6,226,523 B1 | 5/2001 | Karlsson et al. |
| 6,243,375 B1 | 6/2001 | Speicher |
| 6,246,996 B1 | 6/2001 | Stein et al. |

(Continued)

FOREIGN PATENT DOCUMENTS

WO  WO-02/28127  4/2002

*Primary Examiner*—Frantz B Jean
(74) *Attorney, Agent, or Firm*—Edwards Angell Palmer & Dodge LLP; Peter J. Manus

(57) ABSTRACT

A communication system and method transmits electronic mail among multiple users that are senders or recipients of the mail, or both. The system and method use and augment the Internet with a postal server and software (ePostal Service) linked to the Internet. The sender and recipient have terminals also linked to the Internet. The sender uses postal sender software to select transmission using the ePostal Service, with certain automatic premium services, and select certain optional premium services, typically available for an additional cost. The system and method include payment and accounting functions for use of the premium services. The system and method can operate with networks serving multiple terminals. Premium services include sender identification and certification, screening of mail for technical and content risks, encryption, confirmation of receipt and opening of the mail, customizable incentives for recipients to open received mail, and post office "window" and mail holding functions.

20 Claims, 15 Drawing Sheets

U.S. PATENT DOCUMENTS

| | | |
|---|---|---|
| 6,266,692 B1 | 7/2001 | Greenstein |
| 6,282,522 B1 | 8/2001 | Davis et al. |
| 6,285,985 B1 | 9/2001 | Horstmann |
| 6,285,987 B1 | 9/2001 | Roth et al. |
| 6,285,991 B1 | 9/2001 | Powar |
| 6,289,318 B1 | 9/2001 | Barber |
| 6,321,267 B1 | 11/2001 | Donaldson |
| 6,339,761 B1 | 1/2002 | Cottingham |
| 6,347,307 B1 | 2/2002 | Sandhu et al. |
| 6,356,937 B1 | 3/2002 | Montville et al. |
| 6,360,206 B1 | 3/2002 | Yamashita |
| 6,385,592 B1 | 5/2002 | Angles et al. |
| 6,401,075 B1 | 6/2002 | Mason et al. |
| 6,424,828 B1 | 7/2002 | Collins et al. |
| 6,434,621 B1 | 8/2002 | Pezzillo et al. |
| 6,438,583 B1 | 8/2002 | McDowell et al. |
| 6,442,529 B1 | 8/2002 | Krishan et al. |
| 6,446,115 B2 * | 9/2002 | Powers .................. 709/206 |
| 6,449,634 B1 | 9/2002 | Capiel |
| 6,466,115 B1 | 9/2002 | Powers |
| 6,470,079 B1 | 10/2002 | Benson |
| 6,477,647 B1 | 11/2002 | Venkatraman et al. |
| 6,480,582 B1 | 11/2002 | Ungruh et al. |
| 6,486,891 B1 | 11/2002 | Rice |
| 6,487,538 B1 | 11/2002 | Gupta et al. |
| 6,490,354 B2 | 12/2002 | Venkatesan et al. |
| 6,499,055 B1 | 12/2002 | Yamaguchi |
| 6,513,052 B1 | 1/2003 | Binder |
| 6,516,338 B1 | 2/2003 | Landsman et al. |
| 6,785,367 B2 | 8/2004 | Horvath et al. |
| 6,799,179 B2 | 9/2004 | Shetty et al. |
| 6,804,704 B1 | 10/2004 | Bates et al. |
| 2001/0027487 A1 * | 10/2001 | Ruping et al. ............ 709/229 |
| 2003/0180138 A1 * | 9/2003 | Scheltes et al. ......... 414/788.7 |

* cited by examiner

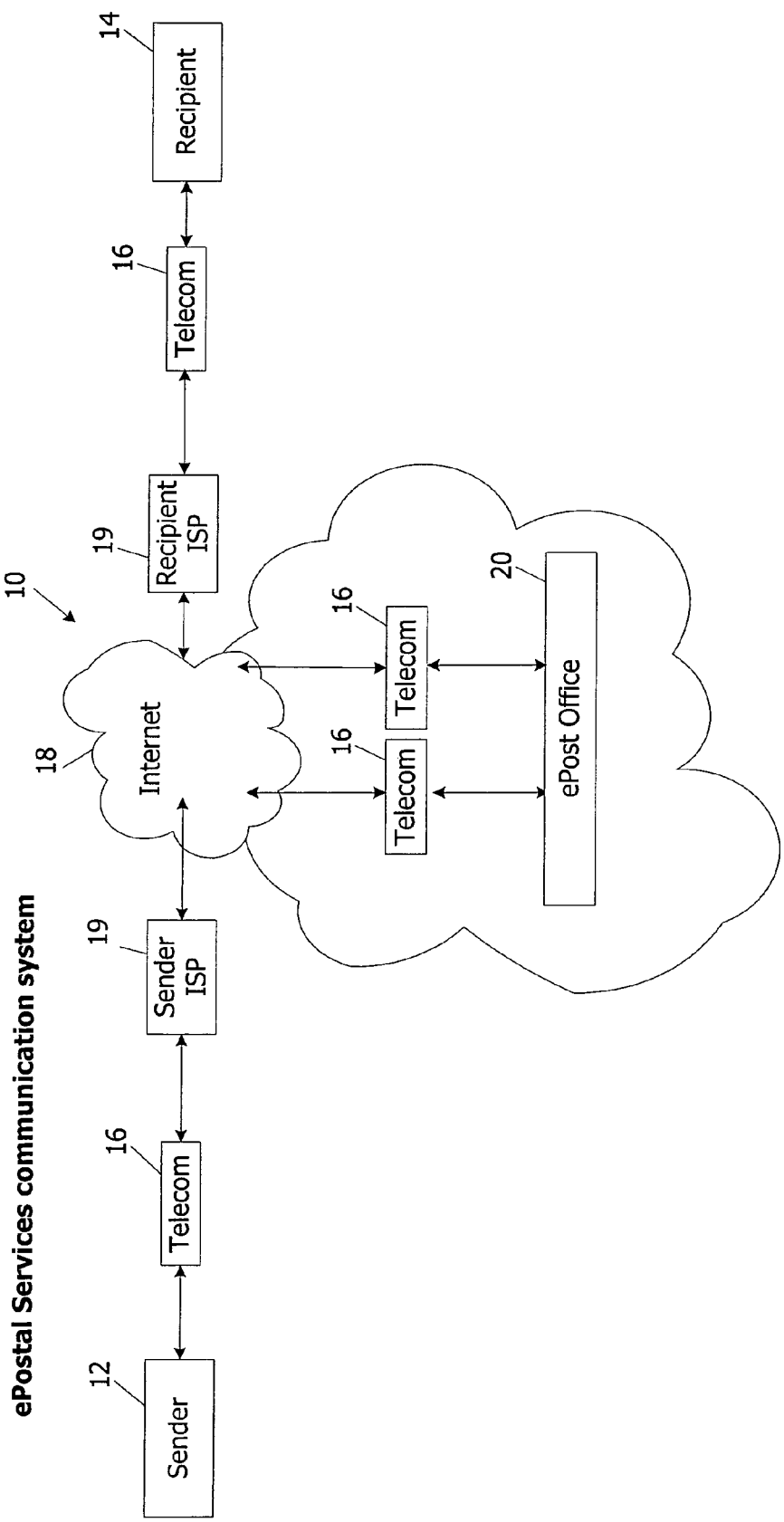

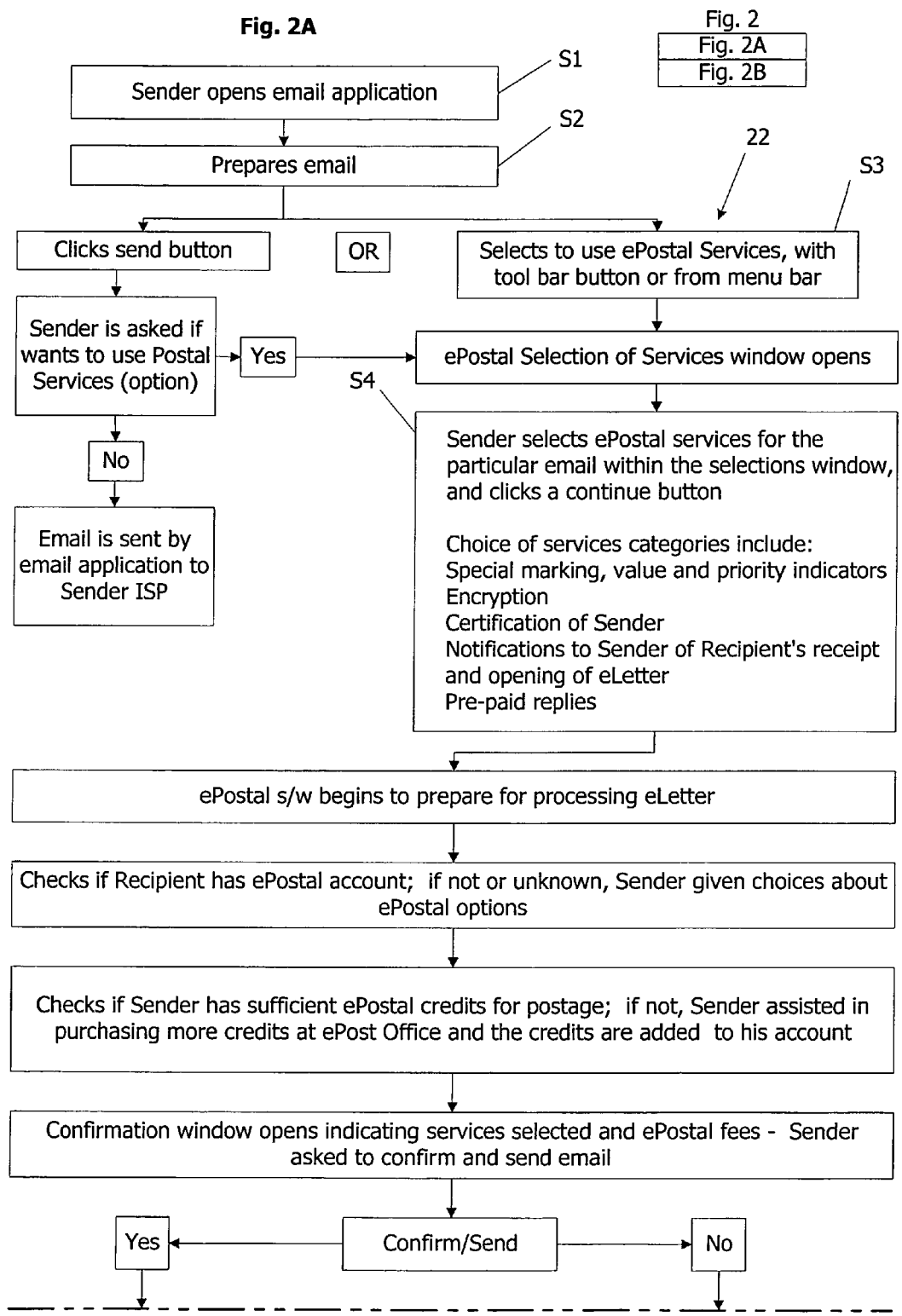

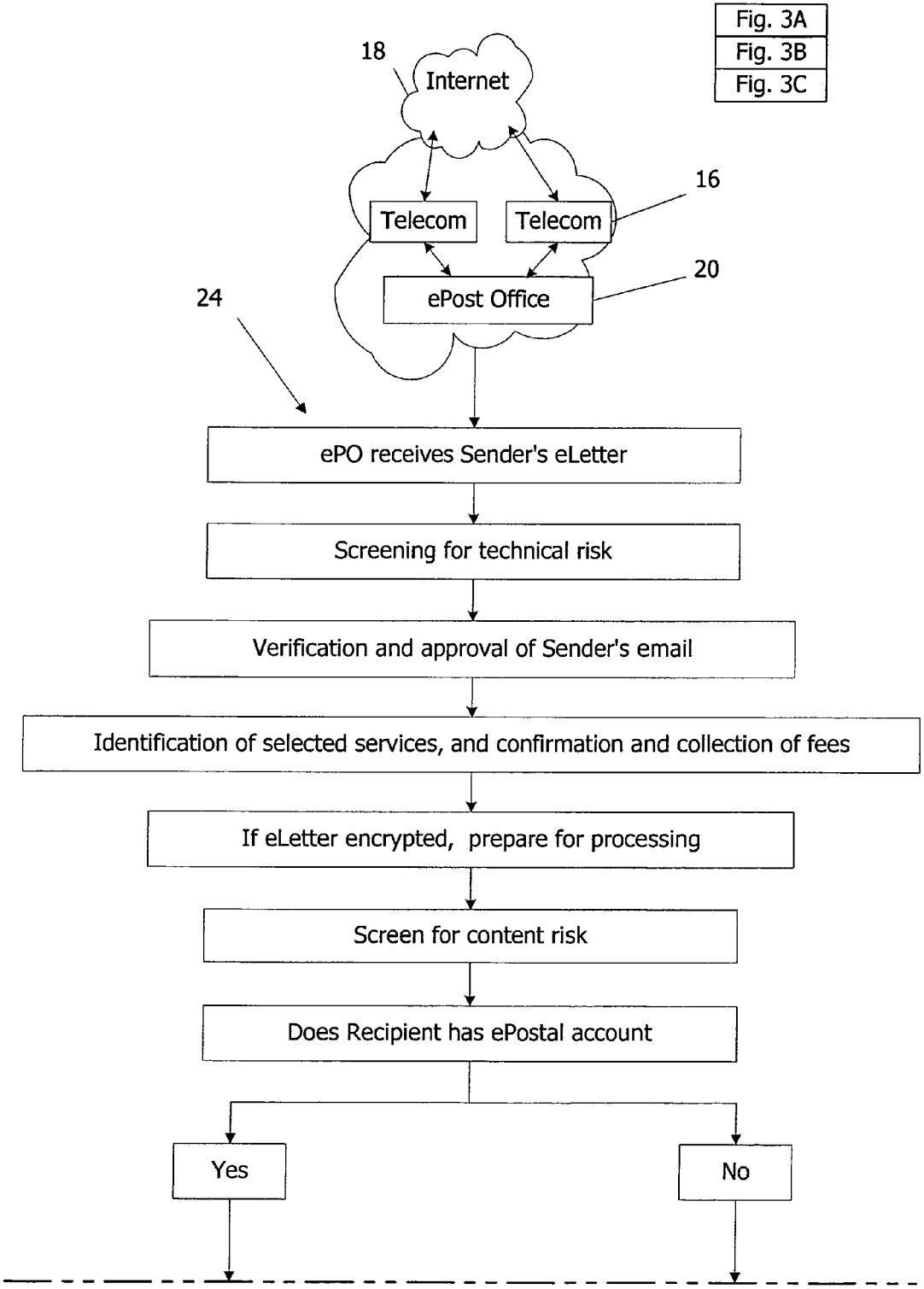

Fig. 3B
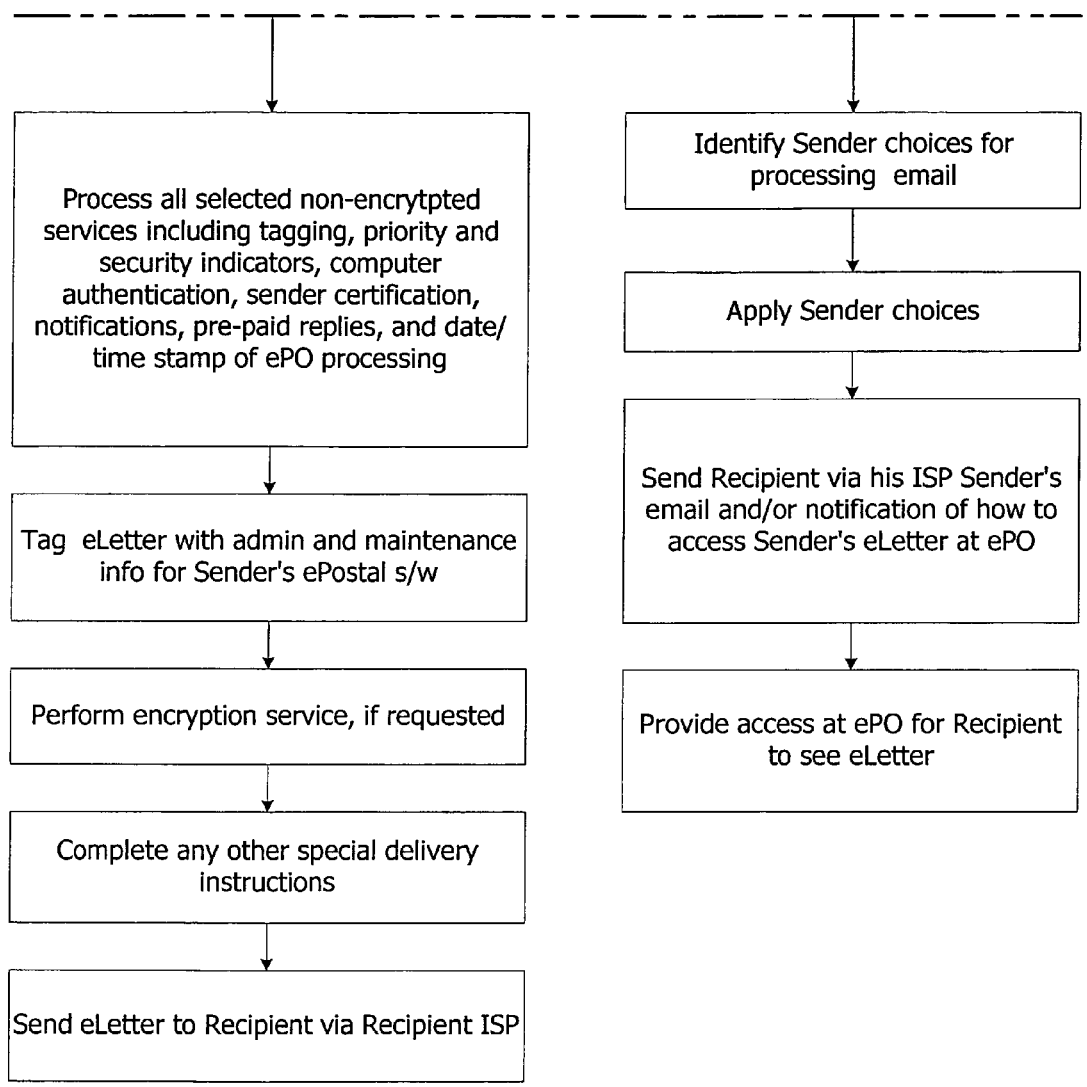
Other ePO s/w functions include:
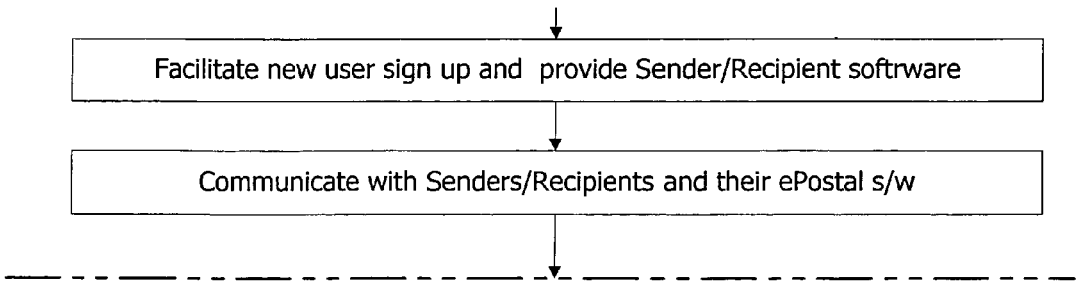

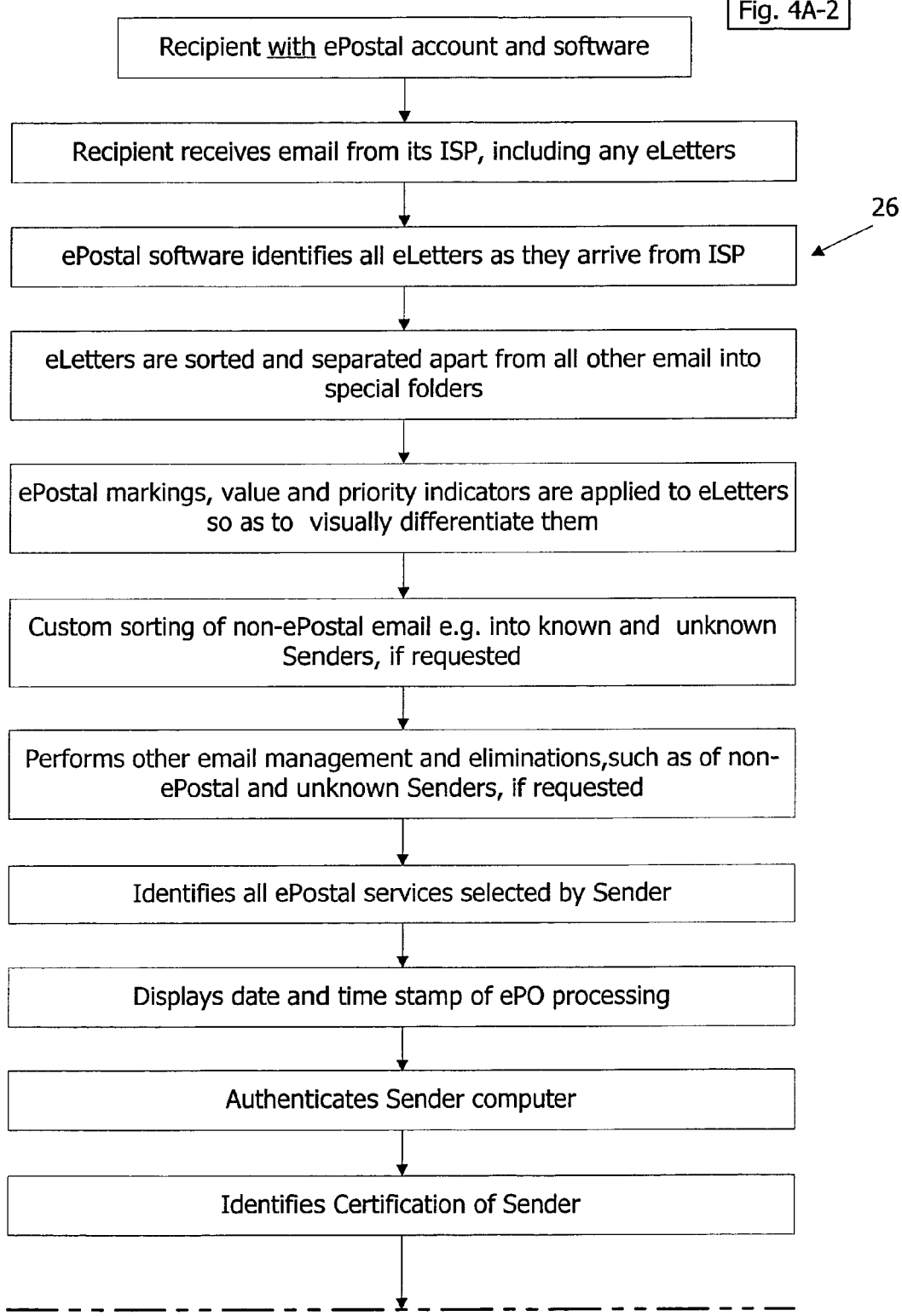

Senders and Recipients can "go" to ePost Office

Network ePostal software

MESSAGING AND DOCUMENT MANAGEMENT SYSTEM AND METHOD

CROSS-REFERENCE TO RELATED APPLICATION

This application claims priority under 35 U.S.C. 119(e) of U.S. Provisional Application No. 60/455,132, filed Mar. 17, 2003.

BACKGROUND OF THE INVENTION

The present invention relates in general to communications systems and methods. More specifically, it relates to a system and method that enables the public to send and receive electronic mail and messages over the Internet with assurances of delivery, security, privacy, priority and manageability.

The Internet has produced a revolutionary change in the sharing of information. The growth in electronic, or "e" mail, over the Internet has been spectacularly robust, with similarly strong future expansion forecasted. Email use is exploding because of the proliferation of computing devices of various types, and because of the greater availability of, and access to, telecommunications bandwidth. An estimated 31 billion email messages were sent daily during 2002, and that number, increasing by more than 20% per year, is expected to exceed 60 billion per day in 2006.

However, this rapid increase in email has produced significant, and largely unanticipated, problems. While email is an easy and inexpensive way to send someone else a message or document, those same attributes have led to recipients receiving unexpectedly large, and increasing, quantities of email, both wanted and unwanted.

The explosion in wanted email is, by itself, causing an ever-increasing overload problem. Of the 31 billion total daily email messages in 2002, an estimated 21 billion per day were wanted emails, i.e., those recipients deem of value, whether solicited or unsolicited in nature. And, that volume of wanted email is expected to reach 36 billion per day in 2006.

Compounding this overload situation is the growing quantity of email that is both unwanted and unsolicited (and sometimes offensive). This increasing volume of nuisance email not only frustrates email recipients but also restricts and constrains the optimal development of the Internet email system. Other negative aspects of this nuisance email—such as reduced business efficiency, increased costs and expanded security risks—are well known. See, for example, the discussion of the negative effects of nuisance email in U.S. Pat. No. 6,321,261 to Donaldson.

As total email volume grows, the recipient's (and sender's) problem becomes analogous to a regular postal mail box that receives far more mail than it can hold. Without such meaningful priority differentiation, a recipient needs to perform a time-consuming review of all daily emails in order to find and review the most important. Often, the magnitude of this repetitive and wasteful task drives recipients to just delete all emails, thereby risking the loss of information which is important and thus has value to recipients and senders alike. This massive message problem of both overload and nuisance email has become so onerous that a better system and method of email document management is urgently required. And, until such a system and method is available, the commercial utility of the Internet will remain constrained for many current or potential users.

For example, one currently constrained area is that of legitimate email marketing—the electronic equivalent of conventional direct mail marketing. Direct mail marketing has been an accepted and effective way of advertising and promoting goods and services for many years, both to consumers and to businesses. Its electronic counterpart has the potential—as yet unrealized—to grow and develop similar levels of acceptability and commercial effectiveness.

Today, the largest share of online advertising is in the form of banner ads, not emails. Of the $2.8 billion spent in the U.S. in 1999 for online advertising, banner advertising accounted for 50%, with email accounting for only 3%. However, banner advertising is notoriously inefficient and plagued by low click-thru rates. Therefore, there is a need for more effective Internet marketing methods—like direct email marketing—to gain audience attention, convey messages, and increase rates of response.

Email not only has a larger base than the Worldwide Web, but email also has the capability to give audiences personalized, media-rich, interactive communication where, and when, they are most receptive—a capability which will elicit a much greater response than banner advertising. But, email marketing cannot reach its full potential unless there is a better way to manage the growing email volume and clutter. At present, the email highways have so much "noise" that it distracts recipients from giving sufficient attention to legitimate online email advertising. Today, it is difficult for a recipient to understand the importance, value and priority of a particular email until it is opened and reviewed. And, this opening and reviewing process is time consuming, and exposes the recipient to technical risks (such as viruses and worms) as well as content risk (such as offensive words and pictures). A constraint on email marketing now is the concern that the communicated messages will be confused with, or associated with, valueless nuisance email.

A corollary problem with the Internet mail system—in addition to both overload and nuisance email—is security. The email security process that now exists is inadequate and impedes expanded usage of the Internet for many potential commercial purposes. Many email applications have encryption procedures, but their procedures are too complex for many email users, or not reasonably and/or generally available in needed situations. As such, email security represents another problem looking for an effective solution.

A good example of the security issue is provided by the email security requirements of the U.S. Federal Health Insurance Portability and Accountability Act (HIPAA). HIPAA has declared that emails (and faxes) which are not secured by encryption are unacceptable for communicating personal health care information (such as diagnosis codes, test results and certificates of medical necessity) among doctors, other health care providers, and insurance organizations. When this law went into effect in the United States in October 2003, many health care service firms still had no email systems which met the HIPAA requirements for communicating protected health care information. Technology is not readily available, or is not acceptably cost-effective for many health care providers. This situation continues today, unresolved.

For wanted email, there is currently no known solution to the email overload and priority differentiation problems described above.

For the unwanted, unsolicited, nuisance email portion of the problem, some vendors supply software filters that block and exclude emails using various rules applied to email subject lines, sender addresses, and some content of the email. This software can reside on a service provider's server or the user's computer system. These nuisance email blockers allow the customer varying capabilities to adjust the filter rules. The aforementioned '267 patent to Donaldson also discusses the various categories of known nuisance email control solutions as of 1999. The '267 patent itself describes an active probe filter with multiple layers of defense located in a conventional firewall configuration between a remote host and a local message transfer agent.

One recent example of such a software filter service is an Internet Service Provider (ISP) that uses a filter sold under the trade designation "Brightmail" within its email system. The filtering rules and software are controlled by the ISP, and the existence of this filter was even unknown to at least some of its customers when the filter was initially activated. Some, but not all, unsolicited email is blocked. Unfortunately, some unsolicited-and-wanted email is blocked, and some unsolicited-and-unwanted email still comes through. Even worse, some wanted (and solicited and expected emails) are also blocked, and a recipient does not know at the time that they have been blocked. To see if and what emails are being blocked, a customer must leave his email application, go to the ISP's website, enter a particular area of that website, log in with I.D. and password, and scroll through days and lines of emails. To unblock specific senders, a customer must email the sender's email address to the ISP, which is the only entity that can correct the filtering rules.

Included among the many drawbacks of these nuisance email filtering services and software are that they:

Block many wanted emails from reaching recipients. One information technology market research firm has estimated that this problem cost businesses $3.5 billion in 2003.

Allow many economically valueless, unwanted, unsolicited and offensive emails to reach recipients. And, these cost businesses an estimated $10 billion in 2003.

Do not filter or screen email for content risk by any general, public standard.

Do not universally screen email for technical risk.

Do not provide any publicly accepted priority or value indicators on emails so recipients can quickly see and automatically sort such higher priority emails from other lower priority email.

Do not provide any means to give incentives to recipients to open priority-designated email.

Do not provide for any integrated email tracking service for senders or recipients.

Do not offer any officially recognized notification of receipt or opening.

Do not offer any comprehensive security measures other than anti-virus screening.

There are other vendors that offer email encryption services, but these services also are not part of a complete service package that addresses the above described email overload and nuisance email problems as well. In addition, most current email encryption and digital signature methods are complex for common email users, including those procedures that are part of current generally-available email applications.

Do not work in many cases easily and seamlessly from within the user's email application.

One example of an organization that has sought to address these defects is the U.S. Postal Service (U.S.P.S.) itself. But, the U.S.P.S. process requires a sender to leave his own email application, go to the U.S.P.S. website, and compose a letter there. The U.S.P.S. then prints the document out, puts it in an envelope, applies postage and physically delivers it. Presently, a one-page letter produced in this fashion costs the sender 50 cents. While some may find this service attractive, it suffers in that the sender cannot use the convenience of his own mail box (i.e., his own email application) to mail the document. Second, this system is still mostly a physical, non-electronic process with all the limitations inherent in physical mail delivery. Third, the recipient cannot make use of his electronic mailbox (that is, his email application) to receive the document.

Today, the need for better email security—like the overload and nuisance email problems—is only met with partial solutions. Providers of secure email services focus only on secure email services. In addition, these partial services often involve cumbersome procedures including, for example, requiring senders to leave their email applications and log into the service provider's website.

It is therefore an object of this invention to provide a complete and commercially viable solution to all these email problems without impeding the nature of the Internet.

BRIEF DESCRIPTION OF THE DRAWINGS

FIG. 1 is a block diagram of an ePost Office and ePostal Internet communication system constructed and operated according to the present invention;

FIGS. 2A and 2B are a flow chart for Sender ePostal operations including Sender ePostal software according to the present invention used in the system shown in FIG. 1;

FIGS. 3A-3C are a flow chart for ePostal server software according to the present invention operating as an ePost Office communicating over the Internet between the Sender and Recipient as shown in FIG. 1;

FIGS. 4A-1, 4A-2, and 4B are flow charts for Recipient ePostal operations with and without, respectively, Recipient ePostal software according to the present invention used in the system shown in FIG. 1;

DETAILED DESCRIPTION OF THE INVENTION

FIG. 1 shows a communication system 10 according to the present invention that connects many system users (although only two are shown) who are, with respect to any given transaction, either a Sender 12 of electronic mail ("email") and attached documents or files, or a Recipient 14 of that email and attached documents or files. The communication system 10 is described herein as an "ePostal Service" and the email carried on the system 10 and handled according to the present invention is also referred to herein as an "eLetter", "document", or simply, "mail". (The term "eLetter" is used only when an email will be or has been processed by this invention.) A given Sender 12 can send the same email to one designated Recipient 14, or multiple Recipients 14. A given Recipient, if a user of the ePostal system, can also be a Sender of his own email. The illustrated Sender 12 can be a Recipient 14, and vice versa. The system 10 includes known telecommunication links 16 between each Sender or Senders 12 and the Internet 18 via a Sender ISP 19 and between the Internet and each Recipient or Recipients 14 via a Recipient ISP 19.

The Sender and Recipient may typically use computing and processing devices known as p.c.'s (personal computers), as shown in FIG. 1 as connected to Internet email and access through an ISP 19, but they can use other computing and processing devices such as servers and hand-helds as well as p.c.'s. These user interfaces devices are termed herein generally as "terminals". It will be understood that the terminals can have varying degrees of intelligence, from what are essentially I/0 devices to devices that provide substantial information processing using resident and/or downloaded software. In particular, the terminals can operate as a component of a network with a server and/or in conjunction with other linked computers and software, to provide the operating functions described below characteristic of this invention. The terms "Sender" and "Recipient" as used herein therefore mean the terminal and software operable on or through that terminal.

Figure 9:
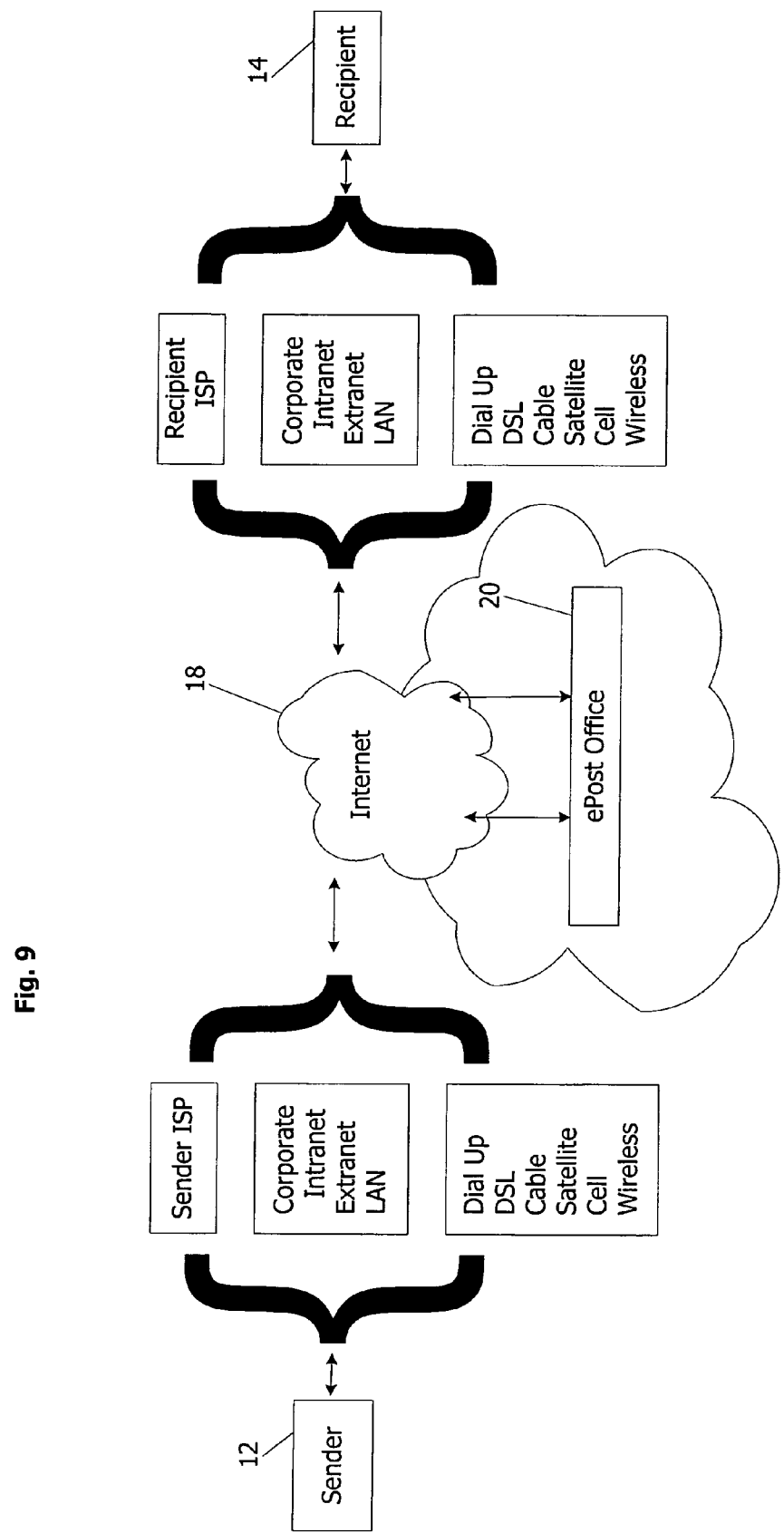
FIG. 9 is a view corresponding to FIG. 1 of another embodiment of the invention using various modes of connection to the Internet.
Figure 10:
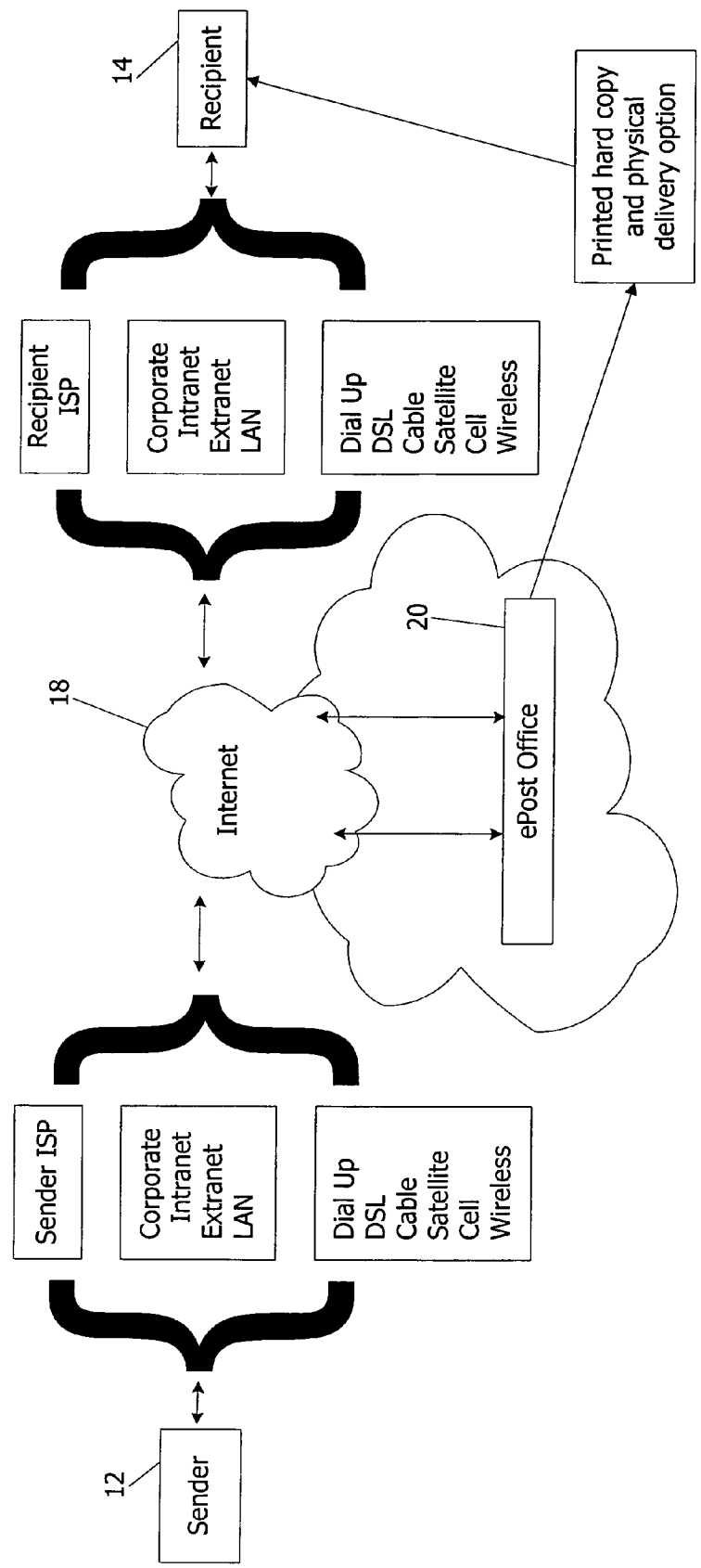
FIG. 10 is a view corresponding to FIG. 1 of another embodiment of the invention showing an option of physical delivery to the Recipient.

In addition, as shown in FIG. 9, although this description in FIG. 1 refers to an ISP 19 as an intermediary between the Sender/Recipient and the Internet, the actual type of email and Internet access server connection can be any existing alternative which provides such services to the Sender/Recipient, such as the email and Internet access servers of corporate intranets or other networks such as extranets, LANs or the like. Conventional firewalls and filters are typically present in this system. Also as shown in FIGS. 9 and 10, the specific type of physical telecommunications connection can also use a number of alternatives, such as telephone, cell, DSL, cable, satellite or other form of wireless communications, and even physical delivery (FIG. 10).

The present invention uses, complements and augments the basic, known SMTP Internet email and Web messaging HITP systems. As used herein, "Internet" is intended to include both. The present invention features an ePost Office 20 (FIG. 1). In its presently preferred form, the ePost Office 20 is a server, or set of servers, running the exemplary software 24, 24' shown in FIGS. 3A.-C, 4B, 6 and 7, and connected into the Internet by telecom links 16. While the ePost Office 20 will be described as a server running postal software 24, 24, it will be understood that the server can be plural servers or equivalent hardware and software. As used herein, the terms "ePost Office", ePO", "postal server" and "postal server and software" encompass all these variations and other known equivalents. The ePost Office 20 communicates and coordinates with and between the Sender 12 and Recipient 14 p.c.'s, servers or the like (the Sender and Recipient Terminals) that run exemplary software 22, 26 of FIGS. 2A, 2B, 4A-1 and 4A-2, which is, in a preferred form, installed on the Sender 12 and Recipient 14 p.c.'s or servers, respectively. The operation of the ePost Office 20, in interaction with the ePostal software 22, 26 at the Sender 12 and Recipient 14 terminals, utilizes both the basic Internet email SMTP system and the standard Web messaging HTTP system. The ePostal component software 22, 26 installed and/or operable on the Sender and Recipient p.c.'s or servers is compatible with the operating system and the application (email and browser) software on those p.c.'s or servers. This software 22, 26 is installed, e.g. in conjunction with the Sender and/or Recipient opening an account with the ePostal Service, e.g. at least in part by downloading.

The Sender 12 in FIG. 1 can choose to send his email over the Internet either in the conventional manner, or using the ePost Office 20. To utilize the ePost Office 20 of this invention, the Sender and Recipient need to do little more in the form of the invention shown in FIG. 1 than what they do in sending or receiving a conventional email. For example, with reference to FIGS. 2A and 2B, the Sender 12 opens the email application S1 and creates an email, Step S2, as usual (with or without attachment) within his own email application. The Sender 12 needs only to click (Step S3) on an icon and proceed through (Step S4) an easy to follow set of selections of services he wants applied to his email by the ePostal system, clicking to continue, confirm and send the eLetter from the Sender's own p.c., all electronically and apparently the same to the Sender, via the Sender's own ISP 19, the Internet 18, and the Recipient's ISP 19, to the Recipient 14, as shown in FIG. 1.

Figure 2B:
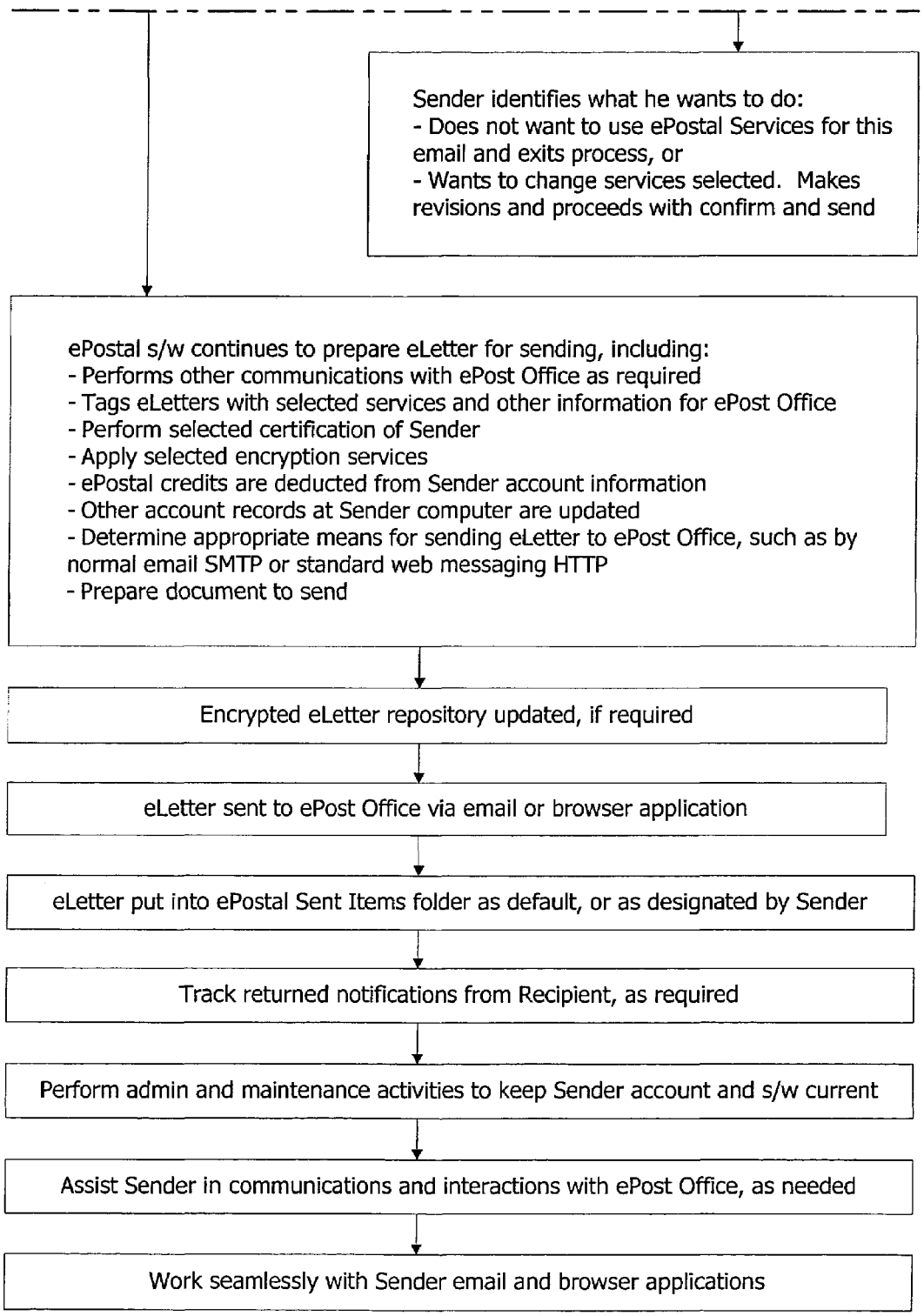
Figure 3C:
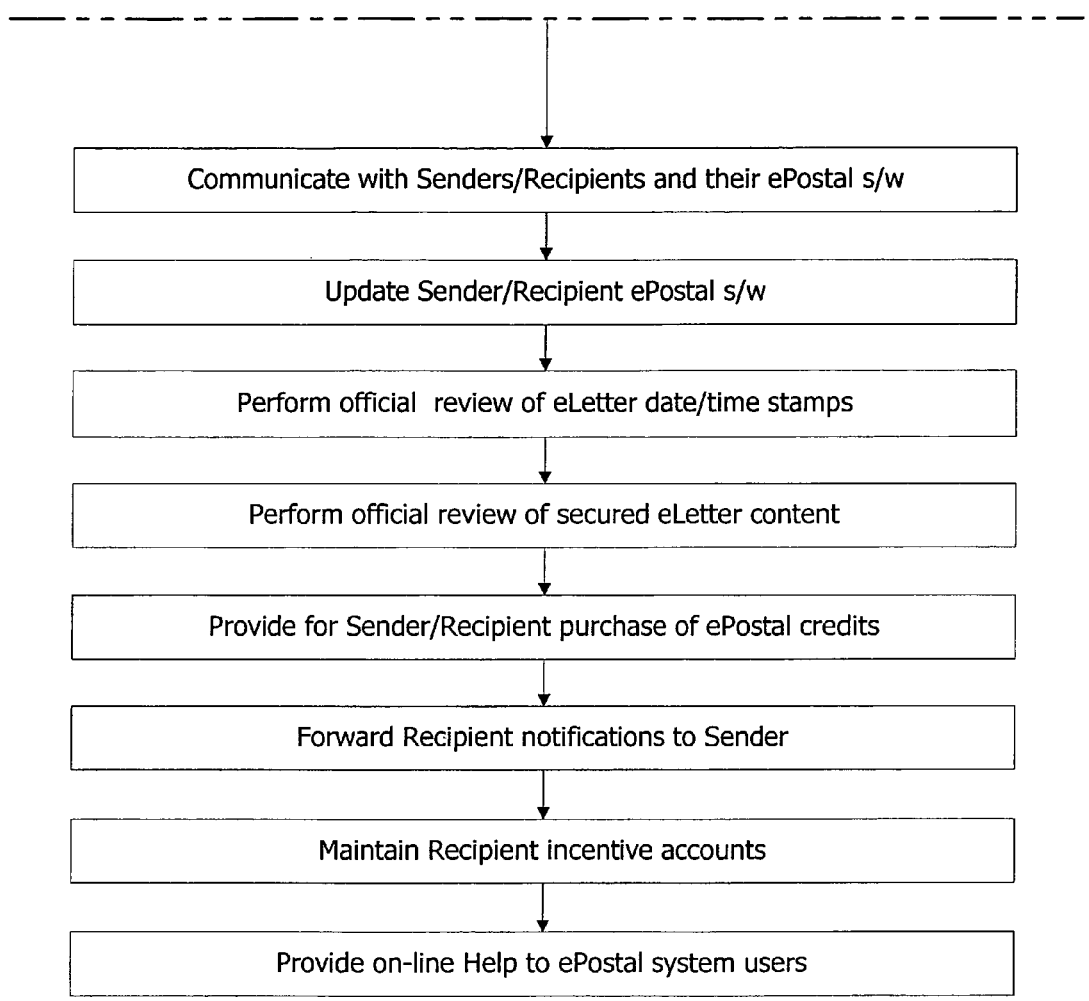

An exemplary Sender software 22 according to the present invention as installed or operable on a Sender p.c., or the like, is shown and described in FIGS. 2A and 2B. The Sender software 22 reflects that the Sender has subscribed to the ePostal Service and has an account with it. Exemplary software 24, 24' according to the present invention that implements the ePost Office 20 in a manner according to the present invention are shown and described in FIGS. 2A, 2B, 3A-C, 4B, 6, and 7, respectively. An exemplary Recipient software 26 according to the present invention as installed on the Recipient p.c. 14, or the like, is shown and described in FIGS 4A-l; and 4A-2. The Recipient software 26 reflects that the Recipient has subscribed to the ePostal Service and has an account with it. It will be understood by those skilled in the art that the specific code implementations of this software 22, 24, 24' and 26 will depend on the operating environment, e.g., the nature of the hardware, system and application software, the nature of the communications system and its operating protocol, interfaces, and the use of features such as encryption, filters, and firewalls. Users of the ePostal System can have different combinations of operating systems and email and browser software. This invention uses interfaces, add-ins, or various sets of procedures and programming each for interfacing with different combinations of sender or recipient operating systems and application (email and browser) software, which also function to interface through the links with the postal server 20

As disclosed in, or with reference to, FIGS. 1, 2A, 2B, 3A-3C, 4A-l, 4A-2, 4B, 6 and 7, the ePost Office 20 and its software 24, 24', in cooperation with the software 22 and 26, accomplishes the mail processing functions of the traditional postal services in a completely electronic process. More specifically, the present invention, as delineated in detail in FIGS. 2A, 2B, 3A-3C, 4A-1, 4A-2, 4B, 6 and 7, operates to provide:

Assistance to Senders 12 in selecting services to be provided

Collection of eLetters from Senders 12 and delivery to ePost Office 20

Receipt and acceptance of eLetters by the ePost Office 20

Screening of eLetters for security purposes

Authentication and certification of Sender 12 and his or her email

Collection of fees for processing eLetters through the system

Application of services and processing eLetters

Inherent reduction or filtering of the number of potential eLetters

Identification, marking and prioritization of eLetters

Indication and stamping of date and time of ePost Office 20 processing

Securing of the process of receipt, transmission and delivery of eLetters

Delivery of eLetters to Recipients 14

Collection of responses/receipts from Recipients 14, as required

Notification to Sender 12 of Recipient 14 responses, as required

Other special services such as:
- Holding eLetters while Recipient 14 is away for an extended time from his mail box/computer and email application
- Providing options for accessing the ePost Office 20, such as going to the ePost Office 20 "window," or website, rather than working through one's own mail box/email application
- Allowing businesses at their own sites to meter, bundle and manage aspects of the ePostal process.

More specifically, the functions of Sender 12 exemplary software 22 as disclosed in or with reference to FIGS. 2A and 2B include:

Assisting Sender 12 at S4 within his own email application in selecting which ePostal services are applied to his email such as:
- Special ePostal industry marking, value and priority indicators which differentiate eLetters from all other email
- Encryption
- Certification of individual Sender 12, as opposed to just the Sender's computer. (Authentication of Sender's terminal is standard with all eLetters)
- Notifications to Sender 12 of Recipient's 14 receipt and opening of eLetters
- Pre-paid replies for Recipient 14 to respond to Sender's 12 eLetter back through the ePostal system
- Hard copy delivery to Recipient 14.

Preparing and processing for eLetters to be sent to ePost Office 20
- Perform needed and appropriate communications with ePost Office 20
- Determine if email Recipient has an account with the ePostal system, and if not, identifying Sender's 12 choices
- Check if Sender 12 has sufficient credits to use the ePostal system, and if not, obtaining more credits
- Tag eLetters with selected services and other information for ePost Office 20
- Encrypt eLetters if required
- Perform certification of Sender 12 if required
- Determine appropriate process for sending eLetters to ePost Office 20, such as based on normal email SMTP or standard web messaging HTTP.

Maintaining repository of encrypted eLetters for proof of content, if designated by Sender 12

Sending eLetters to ePost Office 20

Sorting sent eLetters into special ePostal folders

Tracking returned notifications to associated sent eLetters

Performing various administrative and maintenance account activities to keep Sender 12 current in such areas as: ePostal services offered, credits required, and security features Assisting Sender 12 in managing ePostal communications and interactions with ePost Office 20

Working seamlessly with Sender's 12 email and browser applications

More specifically, the functions of ePost Office 20 ("ePO" is an abbreviation for ePost Office) exemplary software 24,24' as disclosed in or with reference to FIGS. 3A-C, 4B, 6 and 7 involve managing all processing and administrative operations at ePost Office 20 including:

Receiving Senders 12 email

Screening email for technical risk

Performing verification of Sender 12

Reviewing Sender's 12 account for approval to handle Sender's email

Debiting Sender's 12 account for the necessary postage

Performing content screening

Officially receiving and sorting Sender's 12 email

Identifying whether Recipient 14 has ePostal Services account

Preparing Sender's 12 eLetter for delivery to Recipient 14

Processing Sender's 12 email for all requested services, such as tagging, prioritization, authentication of Sender's terminal, certification of individual Sender, encryption, notifications, pre-paid replies, hard copy delivery, etc. Tagging, prioritization and other security coding prevent fraudulent use of ePostal markings and indicators.

Performing other special delivery instructions

Creating a date/time stamp of ePost Office 20 processing

Sending Sender's 12 eLetter to Recipient 14

Administering Sender 12 and Recipient 14 accounts concerning processed eLetters Obtaining/recording confirmation from Recipient 14 about eLetter receipt and opening, if required Crediting Recipient's 14 incentive account for opening eLetters Forwarding notifications from Recipient 14 to Sender 12

Performing ongoing Sender 12 and Recipient 14 account maintenance

Communicating with Senders 12 and Recipients 14 and their ePostal software 22,26, respectively, as required and appropriate Updating ePostal software 22,26 at Sender 12/Recipient 14

Assisting new users in opening accounts with the ePostal system and in obtaining and installing Sender/Recipient software Assisting Senders in delivering eLetters to recipients without ePostal accounts and software Assisting recipients without ePostal accounts and software to access eLetters at the ePO window, or website Making official analytical determinations of eLetter processing times/dates, when requested Performing analytical verifications of secured eLetter content, when requested These services and those described below in conjunction with the Recipient software, and not provided in the manner of this invention (as an automatic or selectable service provided as a part of an integrated system and service that operates seamlessly with existing email and web messaging and browser applications) by conventional basic Internet and web messaging systems and methods, are termed herein "premium services".

Also, as cited above and shown in FIG. 10, this invention can offer Sender 12 the option to have his eLetter, after being processed by the ePost Office 20 in any of the ways mentioned herein, printed to hard copy, sealed in an envelope and physically delivered to Recipient 14.

Figures 2, 4A:
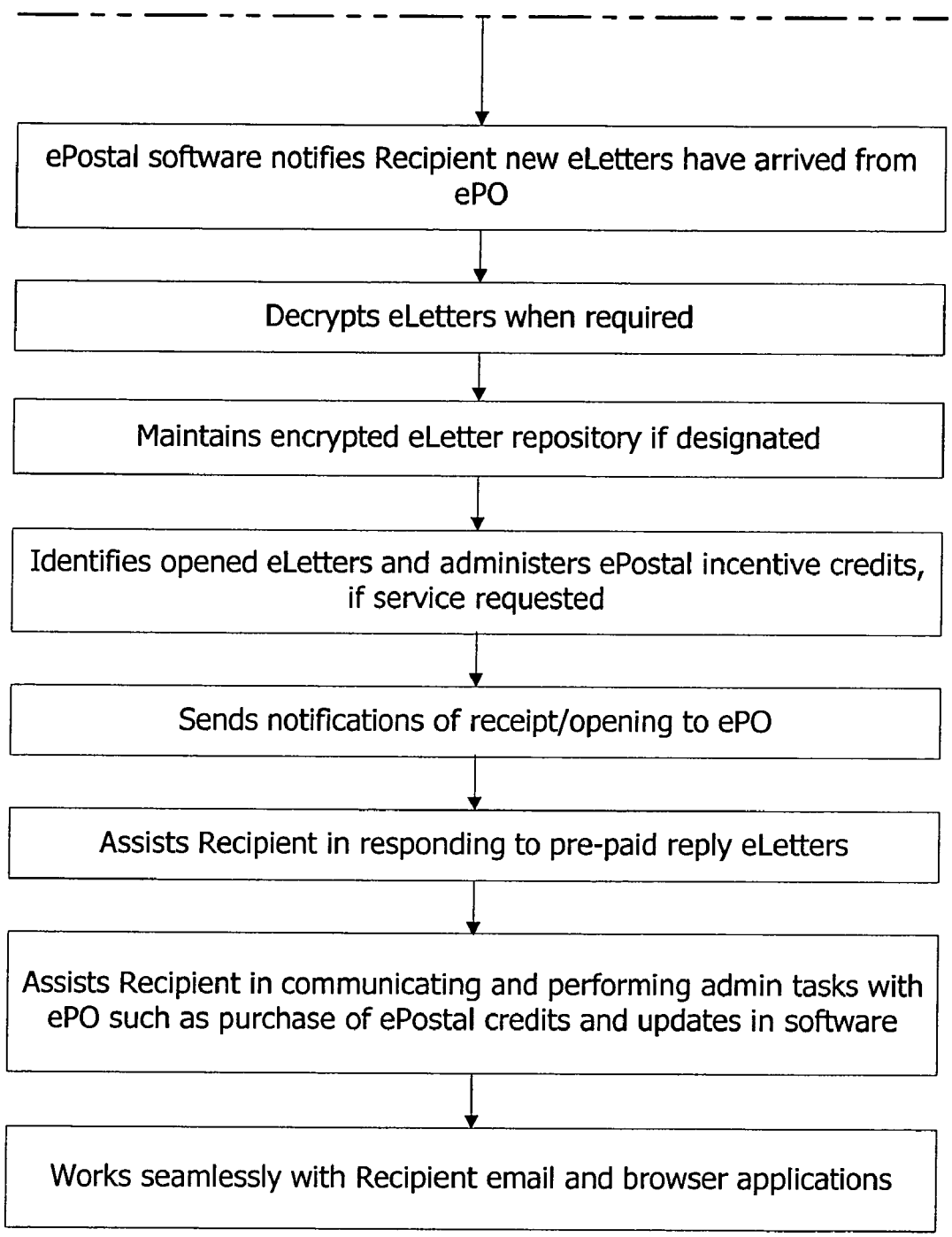

More specifically, the functions of Recipient 14 exemplary software 26 as disclosed in or with reference to Figs 4A-1 and 4A-2 include:

Identifying all eLetters as they are received by Recipient 14

Sorting and separating eLetters apart from all other email either by default or by other Recipient 14 customized instructions, such as into special ePostal Inboxes Applying to all received eLetters ePostal special markings and priority indicators so as to differentiate them visually from all other email Performing special customized sorting of non-ePostal email such as into known and unknown senders, if designated by Recipient 14

Performing other email management and eliminations such as deleting all "non-ePostal and unknown sender" email, if designated by the Recipient 14

Assisting Recipient 14 in seeing all ePostal services selected by Sender 12

Decrypting eLetters when required

Maintaining repository of encrypted eLetters for proof of content, if designated by Recipient 14

Identifying Senders 12 who have certified themselves

Identifying eLetters which have been opened

Administering Recipient 14 credits for opening eLetters

Sending to ePost Office 20 notifications of receipt and opening of eLetters

Figure 4B:
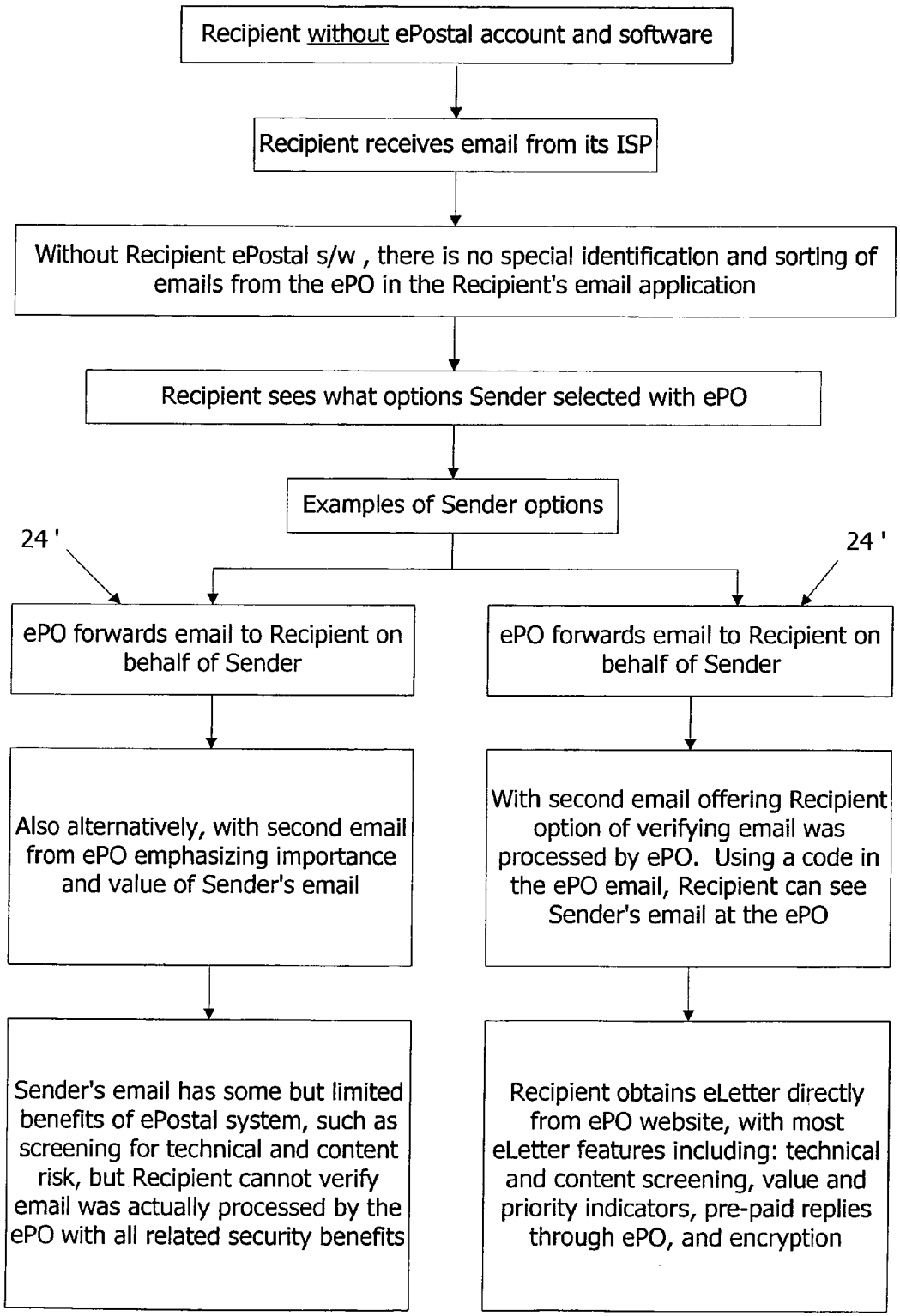

Assisting Recipient 14 in responding to Sender's 12 pre-paid reply eLetters Assisting Recipient 14 in communicating and performing various administrative tasks in conjunction with ePost Office 20 which keeps Recipient's account current Working seamlessly with Recipient's 14 email and browser applications Recipients 14 that do not have ePostal accounts and the exemplary software 26 as disclosed in or with reference to FIGS. 4A-1 and 4A-2 can also receive email and access eLetters processed through the ePost Office 20, as shown in FIGS. 3 and 4B. The email from Sender 12 received by a Recipient 14 without ePostal account and software has limited benefits from the ePostal system beyond screening for technical and content risk. For example, such non-account Recipient 14 cannot verify the email was actually processed by the ePost Office, or is from the Sender 12. Therefore the email lacks the related security benefits of the ePostal system 10, much like regular email. However, this email can offer such non-account Recipients 14 an option for verifying that the email was from Sender 12 and processed by the ePost Office 20. The email can provide the non-account Recipient 14 a code which enables the Recipient 14 to see Sender's 12 eLetter at the ePost Office window, or website 20. These eLetters have many of the features and benefits of the ePostal system such as technical and content screening, value and priority indicators, authentication of Sender's 12 terminal, certification of Sender 12, encryption and pre-paid replies to Sender 12, but also the significant limitations associated with not being received by and residing in Recipient's 14 own email application.

Figure 5:
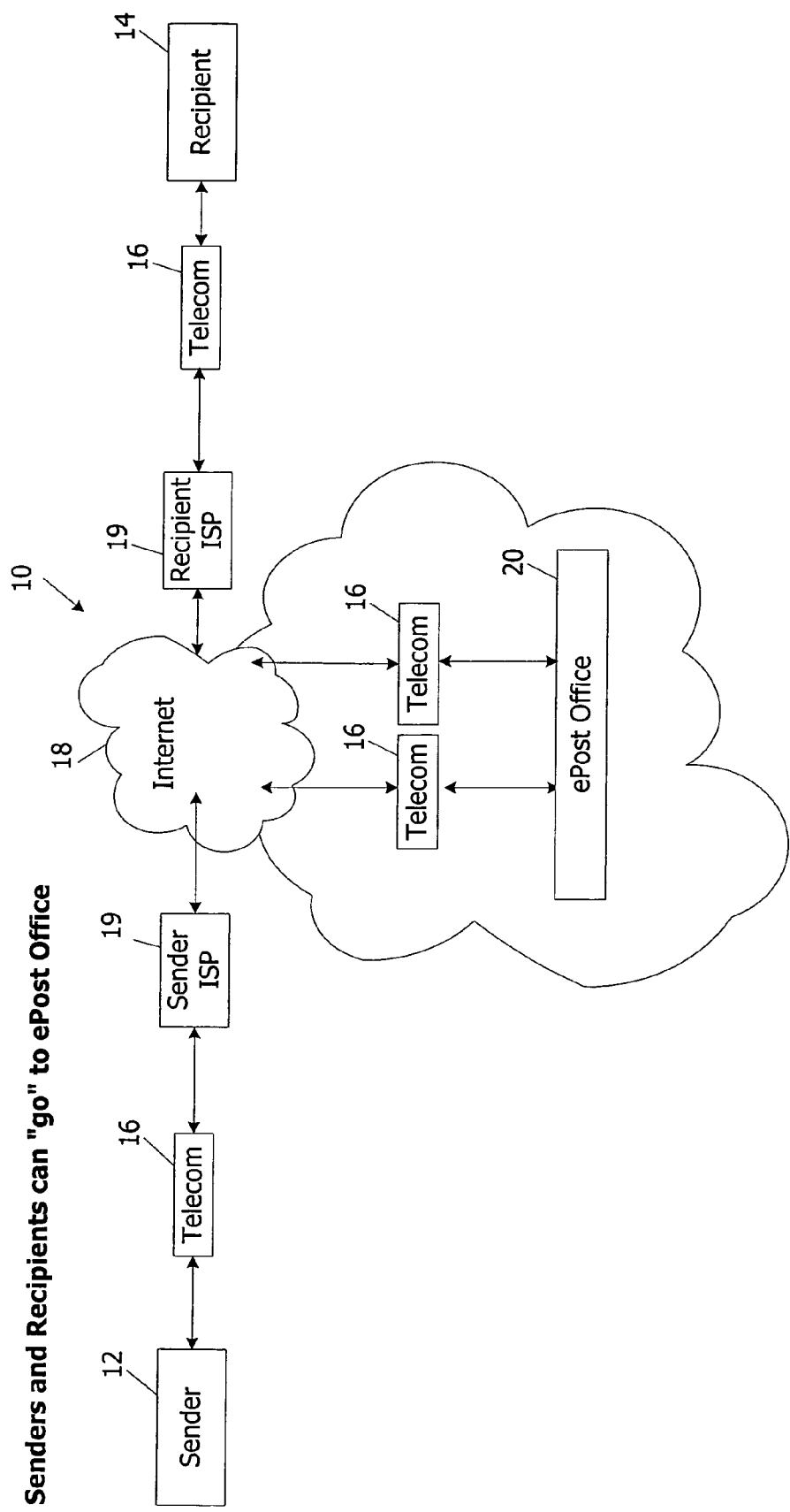
FIG. 5 is a view corresponding to FIG. 1 of alternative embodiments of this invention where Sender and Receipient do not have the ePostal software shown in FIGS. 2A, 2B, 4A-1, and 4A-2 on the computer they are presently using, but have ePostal accounts, and can send and receive eLetters through the ePostal system at the ePost Office window, or ePostal website.
Figure 6:
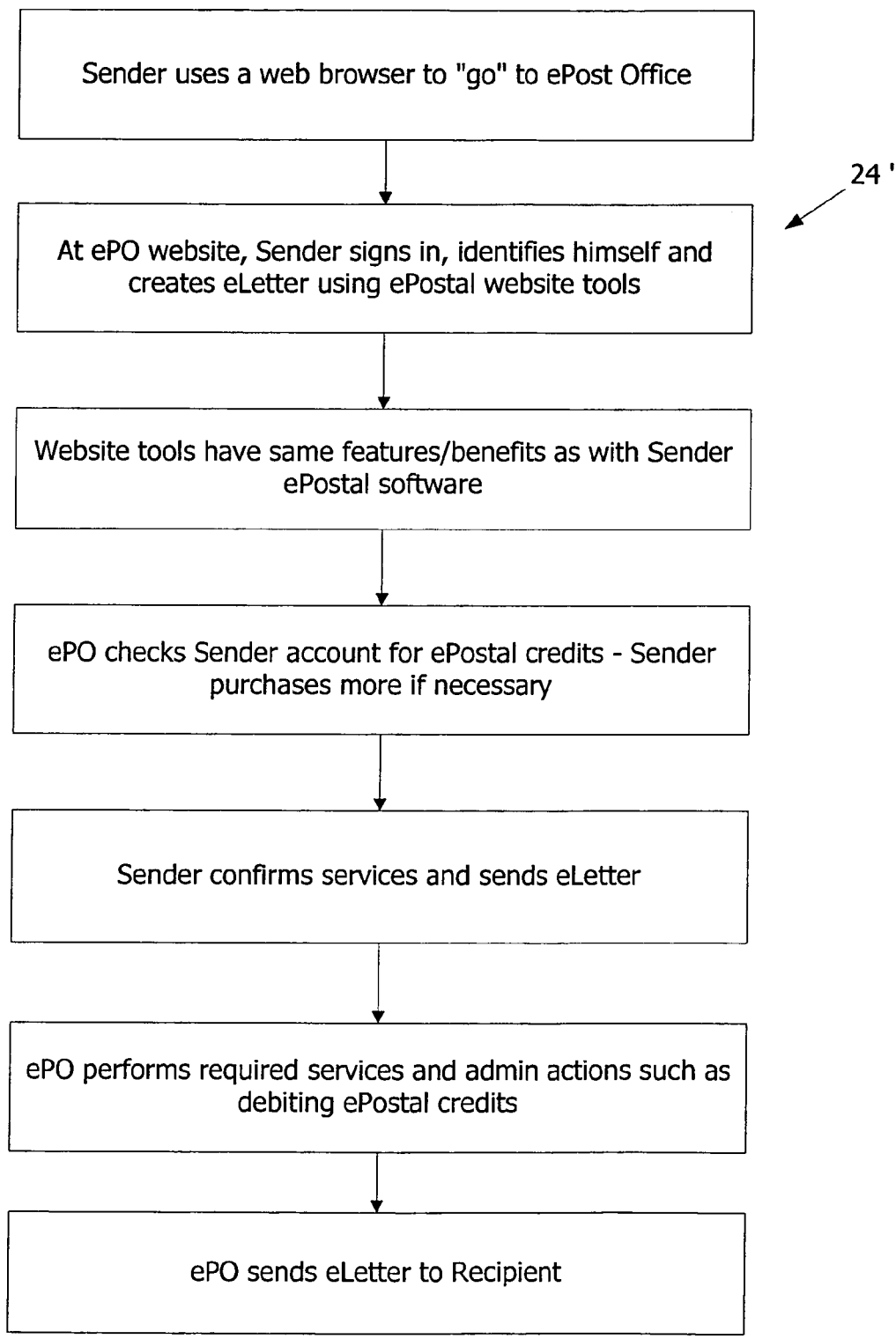
FIG. 6 is a flow chart of the Sender ePostal operational interactions at the ePost Office "window," or ePostal website, according to the present invention for use in the embodiment shown in FIG. 5.
Figure 7:
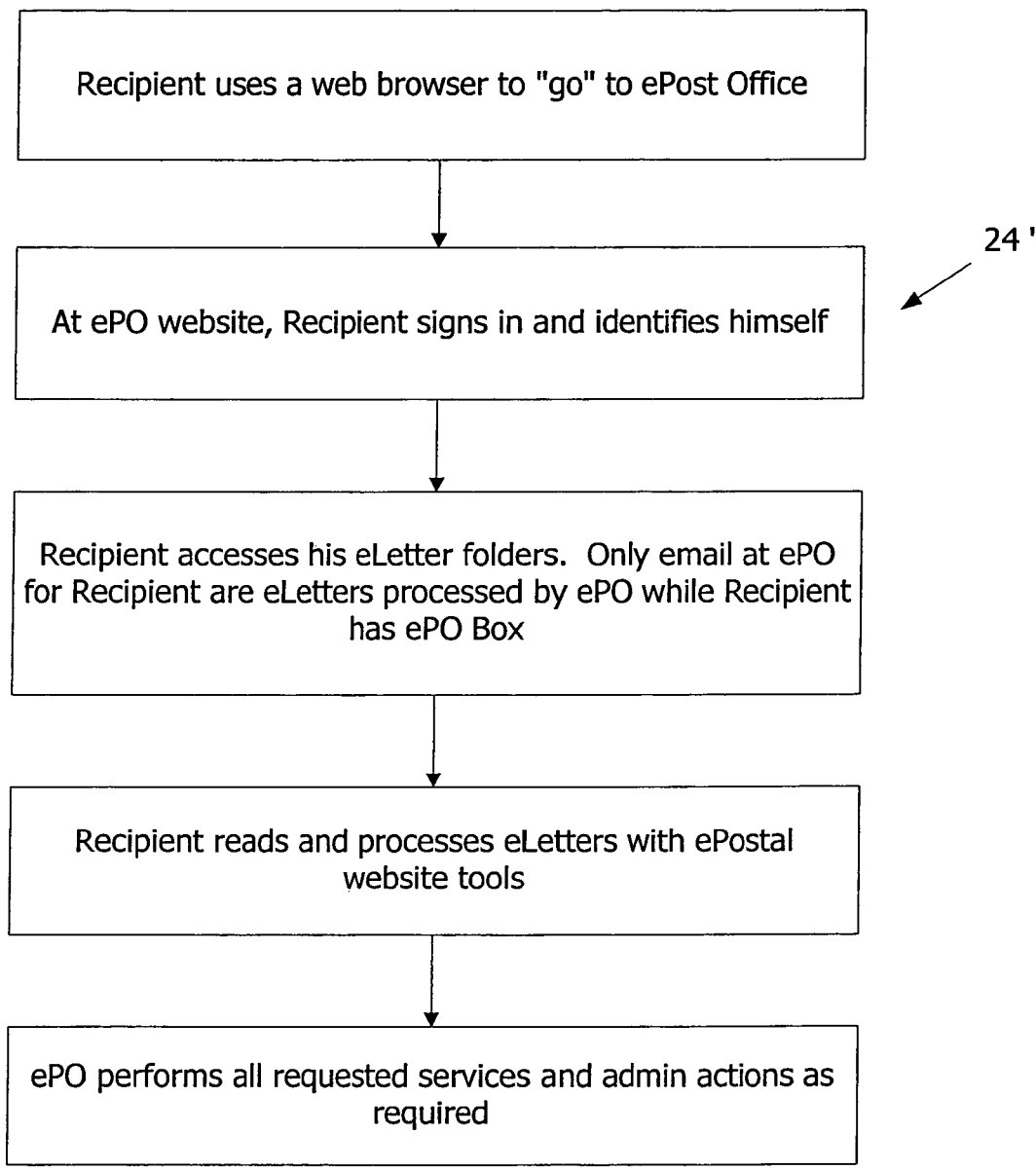
FIG. 7 is a flow chart of the Recipient ePostal operational interactions at the ePost Office "window," or ePostal website, according to the present invention for use in the embodiment shown in FIG. 5.

Another feature of this invention as shown in FIG. 5, like traditional postal services, is that the Sender 12 can "go" to the ePost Office 20 to mail/send his eLetters, and Recipient 14 can "go" to the ePost Office 20 to pick up his eLetters from an ePO "box." An example of where this would be valuable is when Sender 12 and Recipient 14 are away from their terminals that have ePostal software 22, 26. Using any terminal with a web browser, as shown in FIGS. 6 and 7, they can go to the ePO website, log in, and access their account information and tools for sending eLetters and for reading, forwarding, or otherwise handling the eLetters that are held at the ePO for the Recipient 14, just as if Sender 12 and Recipient 14 were using their own terminal with its email, browser and ePostal software.

A variant of the feature described in the above paragraph and also shown in FIG. 5 is where Sender 12 and Recipient 14 can "go" to the ePost Office 20 to mail/send eLetters and pick up eLetters from an ePO "box" even though they do not have ePostal software installed on any terminal but as long as they have opened ePostal accounts at the ePO website. In this situation as well, as described above, Sender 12 and Recipient 14, using any terminal with a web browser, as shown in FIGS. 6 and 7, can go to the ePO website, log in, and access their account information and tools for sending eLetters and for reading, forwarding, or otherwise handling the eLetters that are held at the ePO for Recipient 14.

Figure 8:
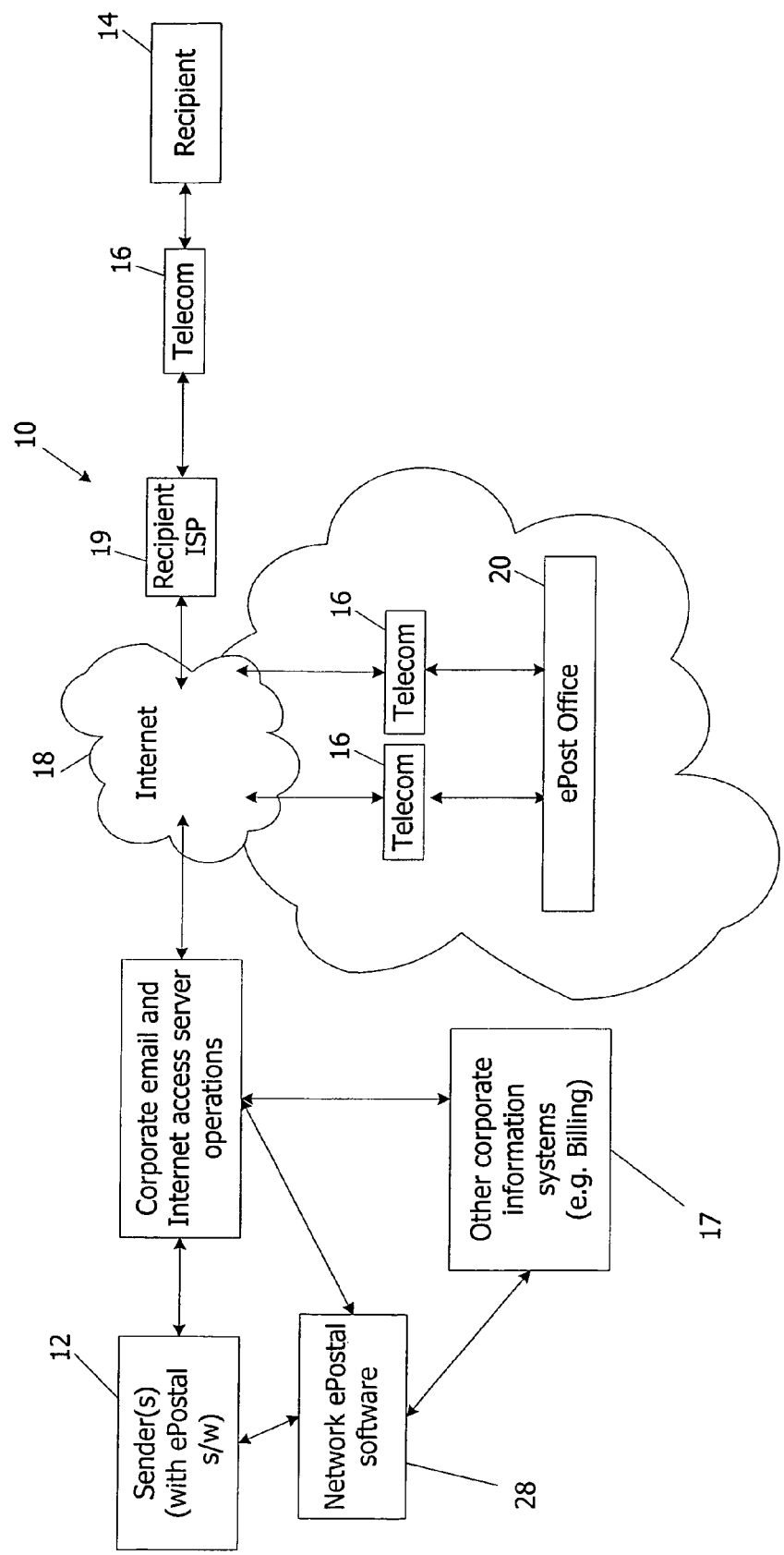
FIG. 8 is a view corresponding to FIGS. 1 and 9 of another embodiment of the invention where, within a network, elements of ePostal operations according to the invention are shared between both the Sender/Recipient level and the network server level.

As mentioned earlier and shown in FIG. 9, Senders 12 and Recipients 14 can have connection to email and Internet access services other than through an ISP, such as from within a corporate intranet or some other organizational network. FIG. 8 shows the corporate intranet example of this non-ISP connection, wherein ePostal software can operate not only at individual Senders' 12 terminals, but also at corporate servers. While corporations are a typical environment for such networks and servers, as is well known, networks of varying size and capabilities operating with varying protocols are used by many entities. For convenience, they are included herein by the terms "corporate", "corporate network", "corporate internet", and "corporate server".

FIG. 8 Senders 12, as shown in FIGS. 2A and 28, can send their email either with or without using ePostal services. However, with a network of Senders using ePostal services, the ePostal operations for the whole organization are much better if the Network ePostal software 28 works with both the Sender ePostal software at Senders 12 and the Corporate eMail Servers 13, rather than if ePostal software is only at the individual Senders 12 computers. Such a system configuration would include: management of available ePostal features, administration of the company's total ePostal credits, communications with the ePost Office 20, and various related data collection and retention activities.

Corporate Senders are not only individuals but also business information systems groups such as accounting and billing. For example, Network ePostal software 28 would assist those Information Systems 17 and the Corporate eMail Servers 13 to prepare, send and provide ePostal services (including ePost Office "postage metering") for business documents sent in the form of eLetters such as customer bills and announcements.

Of course, a business and its employees can also be Recipients 14, as well as Senders 12, residing within the same corporate network. As with Sending operations, when the Network ePostal software 28 works with both the Recipient ePostal software at Recipients 14 and with the Corporate eMail Servers 13, both the corporate network and the ePostal operations can be more effective and efficient. An example of a resulting benefit is the exclusion of many more low value, low priority emails from ever entering the corporate network.

Therefore, companies which include elements of this invention not only on their employee work stations but also at their corporate servers will enjoy in a highly manageable fashion not only the differentiated, secure, encrypted and tracked benefits as ePostal Senders, but also the benefits as ePostal Recipients of regaining significant rational control over their networks by having a way to filter, categorize, distribute and eliminate (where appropriate) incoming emails to reduce unnecessary corporate IT processing, technical risk and bandwidth use while improving the email productivity of its employees.

As discussed above with reference to FIGS. 1 and 9, this invention can work with Senders and Recipients within an ISP network or within some other network such as a business intranet. Network ePostal software 28 referred to in FIG. 8 and discussed above can assist at the network server level not only with business intranets but also with other organizational and ISP networks, where exact features and programming of Network ePostal software for a specific network would vary depending on the network technical configurations and the organizational needs.

Another significant aspect of the present invention is that Senders 12 pay to use the ePostal services, just as with conventional postal services, and can obtain different levels of services for different fees. This in itself has the advantage of prioritizing the email, not only in contrast with all conventional email, but also between eLetters of the ePostal system itself. Also, the payment aspect limits the usage of the system, which provides an automatic market solution to the problem of the increasing volume of "free" email traffic; as discussed earlier, this traffic noise has two components: 1) the overload of legitimate and wanted email, and 2) the unwanted, nuisance email. In addition, Senders are interested in solving problems pertaining not only to email volumes, but also email quality. Senders seek the greater options of security that are inherent and optional with the ePostal system; they also can enjoy the benefits of differentiated, secure/encrypted and tracked emails, more productive email management, ease of use, general accessibility, and support in business intranets and other networks.

Certain Senders 12 will pay to process their most important email through the ePostal system because of "value": value not only to Senders 12 but also to Recipients 14.

Recipients 14 are far more likely to open eLetters than other regular email. First, only the ePostal system offers its unique set of premium email services. Second, Recipients will expect to receive more value and suffer less risk in opening eLetters from the ePostal system than in opening regular email. In general, the ePostal system successfully addresses for the Recipient the Internet mail problems and opportunities of general security, legitimate overload, priority management, encryption, tracking, ease of use, and nuisance email. Some of the many reasons include the following:

Recipient 14 knows that Sender 12 considers the eLetter important enough to pay to send to Recipient, unlike all of Recipient's other regular, free email. That is, Sender 12 is willing to give up something of value in order to have Recipient 14 open his eLetter, where as senders of other regular "free" email are not.

Recipient 14 knows eLetters are screened for technological risk (viruses and worms) and content risk (offensive material) during processing at the ePost Office. Therefore, Recipient does not have the anxiety and pain in opening eLetters that he does with regular email.

Also from a general security standpoint, Recipient 14 knows each eLetter has an authentication of Sender's 12 terminal and email address. More specifically, Recipient 14 will know that his own terminal has verified that the eLetter came from the ePost Office, which earlier verified the original email was from Sender's terminal and can even certify the individual Sender. The ePost Office also gives each eLetter a date and time stamp of processing which can be verified. Recipient could also request Sender to have the ePostal system deliver a hard copy of the eLetter to Recipient.

Recipients 14 also find it easier and quicker to scan, review, read and manage eLetters, due to features such as:

In an email application's general inbox, eLetters will be more clearly and quickly seen because they are marked with ePostal identification and priority markings.

eLetters can be collected upon receipt and placed in a special ePostal folder (or various ePostal folders organized by ePostal priority, Sender address, industry, etc.) in the Recipient's email application. A specified ePostal folder can even open by default.

When new eLetters arrive, special notices are given to Recipient, avoiding delays due to not knowing those important eLetters are available.

If the Recipient 14 is away from his own terminal for an extended time, Recipient can rent an ePostal mail box at the ePost Office website in which his incoming eLetters can be held during that time. Using another terminal with a web browser, Recipient can access his account and ePostal website tools to read (and send) his eLetters.

As to encrypted eLetters, Recipient 14 knows it is quick and easy without special computer knowledge to receive, decrypt and read encrypted eLetters processed through the ePostal system. The system will also help Recipient archive encrypted eLetters for content verification purposes. This is of significant value where encrypted email is required in highly dispersed, regulated situations such as the health care industry due to HIPAA, and where ease of use is important.

As to dealing with unwanted, nuisance email, the ePostal system does not interfere with the Recipient 14 receiving all his regular email and will not delete any of the Recipient's non-ePostal email, unless Recipient chooses otherwise. It will not interfere with his other email security measures. However, the ePostal system can, if Recipient chooses, sort out and place all non-ePostal and non-Address Book (unknown Senders) email into a separate folder. This "third category" folder of unsolicited, unknown, unwanted, nuisance email could then be easily deleted in mass.

As mentioned earlier, Recipients 14 with an ePostal account, besides having the full range of ePostal features available for receiving and managing eLetters, can be credited an economic incentive to open eLetters. This credit can be used by Recipient to send his own eLetters through the ePostal system, or after a certain credit balance is reached, it can be given to the Recipient periodically.

All these features work easily and seamlessly from within Recipient's 14 own email application.

When the ePostal system works together with business or other organizational network email and Internet access servers, IT departments can regain significant control over their networks by having the means at the network level to filter, categorize, distribute and eliminate incoming emails where appropriate. This reduces the otherwise unnecessary IT processing, technical risk to their network and systems, and bandwidth requirements, all of which saves money and downtime. It also improves the email productivity of the business' employees.

Therefore, given that Recipients 14 ascribe greater value to eLetters than to other email and that Recipients are far more likely to open eLetters than other email, the value to Senders 12 in using the ePostal system will far exceed their costs. However, in addition to Recipients greatly valuing eLetters, Senders have even more reasons to value processing their most important email through the ePostal system.

Differentiated eLetters. The ePostal system marks the eLetter with distinguishing priority and service indicators. Sender 12 knows, when Recipient 14 scans his email log, Recipient will see not only that the eLetter has been processed by the ePostal system (and therefore known by Recipient to be secure, credible, and important enough for Sender to pay for its delivery) but also these priority and service indicators differentiate it from all the other regular "free" email that Recipient has in his Inbox, and from other lesser priority (and lesser cost) eLetters that have come through the ePostal system. Sender knows Recipient understands the eLetter has minimal risk from viruses and offensive material, and the eLetter's Sender is verified. Sender also realizes that Recipient can sort eLetters to make them more easily viewable and accessible. Therefore, Sender knows Recipient is far more likely to open and read ePostal eLetters than regular email. Essentially, the effect of all these features (priority indicators, sorting and security) is to put Sender's eLetter "on top" of Recipient's pile of regular email. An appropriate analogy is choosing overnight delivery rather than conventional mail, but not because of faster delivery—but because Recipients are more apt to look at and open premium delivered "mail containers" before they open regular mail.

Easy encryption. eLetters can be securely encrypted by Senders 12 in an extremely quick, easy, and generally available way. Senders do not need to obtain and distribute special digital keys to whomever they might need to dash off an important, encrypted email. This presents a new, very valuable option to Senders who require secure, encrypted communications such as mentioned earlier about HIPAA and the health care industry. Senders, as well as Recipients 14, can archive encrypted eLetters for content verification purposes.

eLetter tracking. Sender 12 can request notification of eLetter receipt/opening by Recipient 14. It serves as a valuable record for Sender which can be linked to Sender's original eLetter. This is enormously important in facilitating arrangements between businesses and their customers and clients concerning the exchange of information by the Internet. With such records, businesses can finally link their electronic systems to reliable electronic delivery and tracking systems, creating enormous cost savings, especially with ePostal system's generally available security measures.

Special treatment of Recipients 14. Recipients will not only perceive value but also can receive incentives for receiving/opening eLetters, which gives Senders 12 even greater assurance Recipients will open their eLetters. Senders can also pre-pay for responses from Recipients to their eLetters back through the ePostal system which should appeal to Recipients and increase such responses (and value) for Senders.

Ease and flexibility of use. ePostal services are easy to use for Senders 12 also. Selections for services are all made from within and work seamlessly with Sender's email application. Sender's sent eLetters can be automatically managed into special folders by priority, Recipient 14, etc., separating them from his regular sent email. And when Sender is not at his own terminal, he can access at the ePO website his ePostal account and tools for sending (and receiving) eLetters.

While all Senders 12 will appreciate ePostal features, businesses and other organizations especially will value not only the differentiated, secure, encrypted, and tracked email capabilities, but also the enhanced overall communications management effectiveness of the services when, ePostal network-level software is working directly with their network level email and Internet access servers and other business information systems.

The subsequent result is that this invention offers very significant benefits for email users, both senders and recipients, and individuals and businesses. Companies, for example, will be able, by including the features of this invention on their employee work stations and at their corporate servers, to obtain—as senders—the benefits of differentiated, secured and tracked emails. Moreover, as recipients, they will benefit from regaining control over their networks by being able to filter, categorize, distribute and eliminate (where appropriate) incoming emails. The result will be reductions in unnecessary processing, technical risk and bandwidth use, accompanied by improved email productivity for all employees. In addition to businesses, networks for other organizations and ISPs would also benefit by including features of this invention on their network servers.

While the invention has been described with respect to its preferred embodiments, it will be understood that various modifications and alterations will occur to those skilled in the art from the foregoing detailed description and the accompanying drawings. For example, while the invention has been described with certain software running or certain hardware at certain locations, it will be understood that the functions described can be distributed, in hardware, firmware and software, in a manner as is well known in the art. Further, while payment and accounting functions are described as carried out by the ePostal server and software, these functions can, in whole or in part, be carried out through links to conventional on-line credit and banking services from the ePost Office 20 and/or other components of the system 10. These modifications and alterations are intended to fall within the scope of the appended claims.

What is claimed is:

1. A communication system that transmits electronic mail among multiple Sender and Recipient terminals and which both uses and augments the Internet, comprising:
   an ePostal server and ePostal server software,
   links connecting the Sender and Recipient terminals and said ePostal server and ePostal server software to the Internet, and Sender ePostal software
   (i) operable on at least the Sender terminal and
   (ii) operable with conventional electronic mail application software also operating on the Sender terminal to
   (iii) selectively provide access by the Sender terminal and said Sender ePostal software to said ePostal server and ePostal server software for managing and processing the electronic mail transmitted from the Sender terminal in order to provide the communication system's premium mail services to the electronic mail, and
   (iv) begin processing of said premium mail services to the electronic mail.

2. The communications system according to claim 1 further comprising Recipient ePostal software
   (i) operable at least on the Recipient terminal, and
   (ii) operable with conventional electronic email application software also operating on the Recipient terminal, to
   (iii) process the electronic mail, transmitted by the Sender terminal. managed and processed by said ePostal server and Postal-server software, and received by the Recipient terminal via the internet and said Recipient link in order to provide said premium mail services to the electronic mail.

3. The communication system according to claim 2 wherein at least one of said Sender and Recipient ePostal software is software stored at the Sender and Recipient terminals.

4. The communication system according to claim 2 wherein at least one of said Sender and Recipient ePostal software is stored and accessible to the Sender and/or Recipient at said ePostal server.

5. The communication system according to claim 2 wherein said links comprise a network interconnecting the multiple terminals to the Internet, at least one of said ePostal Sender, Recipient and server software is stored and/or accessible to the Sender and/or Recipient at said network.

6. The communication system according to claim 2 wherein said Sender ePostal software and ePostal server software include payment software to authorize and account for payment for use of the communication system.

7. The communication system according to claim 6 wherein said Sender and Recipient ePostal software and said ePostal server software include said payment software to account for incentive credits for the opening of the electronic mail at the Recipient terminal.

8. The communication system according to claim 6 wherein said premium services include optional selectable premium services and said payment software accounts for the collection of an additional fee in response to said Sender ePostal software selection of one or more of said optional premium services.

9. The communication system according to claim 1 wherein said connecting links between the internet and any of the Sender terminal, Recipient terminal, and ePostal server includes a telecommunications link.

10. The communication system according to claim 1 wherein said connecting links between the internet and any of the Sender terminal, Recipient terminal, and ePostal server includes a link selected from the group consisting of: ISP, intranet, extranet, LAN, dial up, DSL, cable, satellite, cell, wireless, and combinations thereof.

11. The communication system according to claim 1 wherein said premium services for the electronic mail are selected from the group consisting of: identification of the Sender; certification of the identity of the entity operating the Sender terminal; prioritization of the sent and received electronic mail; screening of the electronic mail for technical risks; screening of the electronic mail for content risks; encryption of the electronic mail; notification to the Sender of receipt of the electronic mail; notification to the Sender of opening of the electronic mail; pre-paid replies for the Recipient to respond to the Sender through the communication system;
customized incentives for the Recipients to open the electronic mail;
verifiable date and time stamp of ePostal server processing; customized verification of content of the electronic mail; creation of secure holding of the electronic mail at the Sender, Recipient and ePostal server; and payment and accounting for said premium electronic mail services; and combinations thereof.

12. The communication system according to claim 11 where said prioritization is a differentiation between the electronic mail processed by the communication system and conventional electronic mail carried in the Internet.

13. The communication system according to claim 11 wherein said prioritization comprises a differentiation among the electronic mail processed by the communication system.

14. The communications system according to claim 1 wherein the Sender and Recipient terminals and the Internet can have different combinations of operating systems and electronic mail application software, and wherein said Sender and Recipient ePostal software are adapted to interface across said different combinations with said ePostal server and ePostal server software.

15. A method of communication for electronic mail among multiple Sender and Recipient terminals that both uses and augments the Internet, comprising:
providing an ePostal server and ePostal server software;
linking the Sender and Recipient terminals to the Internet and said ePostal server and ePostal server software;
providing Sender ePostal software
(i) operating on the Sender terminal, and
(ii) operating with conventional electronic mail application software also operating on the Sender terminal.
(iii) to provide selectively access by the Sender terminal and said Sender ePostal software to said ePostal server and ePostal server software for managing and processing the electronic mail transmitted from the Sender terminal in order to provide the communication system's said premium electronic mail services to the electronic mail and
(iv) to begin processing of said premium mail services to the electronic mail, 16. The method of claim 15 further comprising:
providing Recipient ePostal software:
(i) operable on the Recipient terminal, and
(ii) operating with conventional electronic mail application software also operating on the Recipient terminal,
(iii) for processing the electronic mail, transmitted by the Sender terminal, managed and processed by said ePostal server and ePostal server software, and received by the Recipient terminal via the Internet and said Recipient link, in order to provide said premium mail services to the electronic mail.

17. The method of claim 16 where said linking includes telecommunicating.

18. The method of claim 16 wherein said linking includes networking multiple ones of the Sender and Recipient terminals.

19. The method of claim 16 wherein said Sender ePostal software and said ePostal server software processing includes payment and accounting services for at least a portion of said premium mail services.

20. The method of claim 19 wherein said payment and accounting services account for incentives to a user of the Recipient terminal for opening of the electronic mail at the Recipient terminal.

* * * * *

UNITED STATES PATENT AND TRADEMARK OFFICE
CERTIFICATE OF CORRECTION

PATENT NO. : 7,502,828 B2  
APPLICATION NO. : 10/803601  
DATED : March 10, 2009  
INVENTOR(S) : Jon S. Gardner Page 1 of 1

It is certified that error appears in the above-identified patent and that said Letters Patent is hereby corrected as shown below:

Title Pg. Item (56) Ref. Cited:

On page 2, U.S. Patent Documents, please delete:

"6,466,115 B1 9/2002 Powers"

Title Pg. Item (56) Ref Cited:

On page 2, U.S. Patent Documents, please correct:

"6,799,179 B2 9/2004 Shetty et al." should be --6,799,197 B2 9/2004 Shetty et al.--

Signed and Sealed this

Twenty-eighth Day of April, 2009

JOHN DOLL  
*Acting Director of the United States Patent and Trademark Office*

UNITED STATES PATENT AND TRADEMARK OFFICE
CERTIFICATE OF CORRECTION

PATENT NO. : 7,502,828 B2  Page 1 of 1
APPLICATION NO. : 10/803601
DATED : March 10, 2009
INVENTOR(S) : Jon S. Gardner It is certified that error appears in the above-identified patent and that said Letters Patent is hereby corrected as shown below:

Claim 2, Col. 15, line 1, change "Postal" to --ePostal--.
Claim 2, Col. 15, line 2, change "internet" to --Internet--.
Claim 9, Col. 15, line 36, change "internet" to --Internet--.
Claim 10, Col. 15, line 40, change "internet" to --Internet--.
Claim 15, Col. 16, line 34, after "mail" insert a --,--.
Claim 15, Col. 16, line 36, delete the "," and insert a --.--.

Signed and Sealed this

Eighth Day of June, 2010

David J. Kappos
*Director of the United States Patent and Trademark Office*